(12) United States Patent
Ramadoss

(10) Patent No.: US 9,792,151 B2
(45) Date of Patent: Oct. 17, 2017

(54) ENERGY EFFICIENT BURST MODE

(71) Applicant: Intel Corporation, Santa Clara, CA (US)

(72) Inventor: Murali Ramadoss, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 14/107,070

(22) Filed: Dec. 16, 2013

(65) Prior Publication Data

US 2015/0169381 A1    Jun. 18, 2015

(51) Int. Cl.
*G06F 9/48*     (2006.01)
*G06F 1/32*     (2006.01)

(52) U.S. Cl.
CPC .............. *G06F 9/4893* (2013.01); *G06F 1/32* (2013.01); *Y02B 60/144* (2013.01)

(58) Field of Classification Search
CPC ......... G06F 9/4893; G06F 1/32; G06F 9/5094
USPC ........................................................ 345/522
See application file for complete search history.

(56) References Cited

U.S. PATENT DOCUMENTS 8,284,205 B2   10/2012 Miller et al.
9,104,411 B2   8/2015 Thomson et al.
2012/0144215 A1*  6/2012 Naffziger ............... G06F 1/26
                                                  713/320
2013/0074085 A1*  3/2013 Thomson et al. .......... 718/102
2013/0151869 A1*  6/2013 Steinman ............... G06F 1/324
                                                  713/300
2014/0164757 A1*  6/2014 Dorsey et al. ............. 713/100
2015/0089284 A1*  3/2015 Shirvani ............... G06F 1/30
                                                  714/10

OTHER PUBLICATIONS

Mexican Office Action in corresponding MX application No. MX/A/2014/013947 dated Jul. 2016 (2 pages).
Mexican Office Action in corresponding MX application No. MX/A/2014/013947 dated Nov. 23, 2016 (2 pages).

* cited by examiner

*Primary Examiner* — Ke Xiao
*Assistant Examiner* — Kim-Thanh T Tran
(74) *Attorney, Agent, or Firm* — Trop Pruner & Hu, P.C.

(57) ABSTRACT

A graphics processing unit's workload duration is monitored across a number of frames. A threshold "k" may be used to determine if the workload is Burst or Sustained for a number of frames and another time constant "t" may be used to monitor the burst behavior. If the device continues to be in burst mode over time "t" and the performance state is not an energy efficient state, then the system may lower the performance state to "Pe" and monitor if the same workload remains as Burst. If not, the performance state may be raised to the next higher performance state.

6 Claims, 4 Drawing Sheets

ENERGY EFFICIENT BURST MODE

BACKGROUND

As the tablet and smart phone usage models grow into new game usage models like complex three-dimensional (3D) gaming and web based media playback, increased graphics and central processing unit performance is needed. These units are also constrained by thermal and power budgets due to their small form factor. Hence there is need for more sophisticated algorithms to manage these constraints more efficiently without compromising performance.

BRIEF DESCRIPTION OF THE DRAWINGS

Some embodiments are described with respect to the following figures.

DETAILED DESCRIPTION

Figure 1:
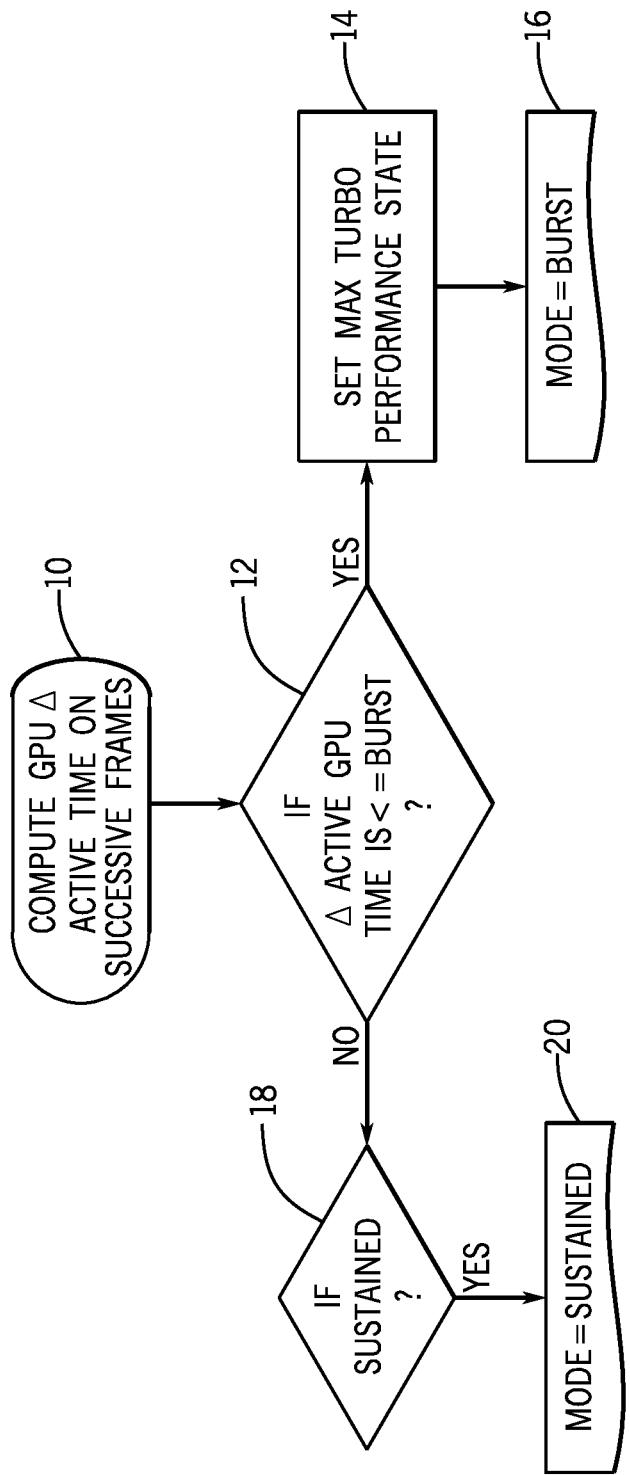
FIG. 1 is a flow chart for one embodiment.

A graphics processing unit's workload duration is monitored across a number of frames. A threshold may be used to determine if the workload is burst or sustained for a number of frames and another time constant "t" may be used to monitor the burst behavior. If the device continues to be in burst mode over time "t" and the performance state is not an energy efficient state, then the system may lower the performance state to an energy efficient performance state that is typically a maximum frequency ($F_{max}$) at a minimum voltage ($V_{min}$), referred to herein as performance state "Pe" and monitor if the same workload remains as burst. If not, the performance state may be raised to the next higher performance state.

In existing power management schemes, performance is managed by simply monitoring the processor utilization over a given time interval. Based on the utilization, performance states are raised or lowered to meet the workload demand. These performance states are scaled linearly at regular step sizes from lower states to higher states. At times the performance states are raised to a maximum available state (max turbo P state) with the assumption that the workload can complete in short time so that device can get to sleep or standby power savings. Many times more power may be consumed on workloads that really do not need such a high performance state.

These power management schemes may not be suitable to enable lower power consuming graphics processors (GPU) and systems on a chip (SOC). Most of the graphics workloads, like web browsing, scrolling the desktop user interface or opening an application on a cellular phone and tablet, need higher performance for short duration. There are also applications, like 3D games and media applications such as video conferencing, that require more sustained performance for longer durations. These use cases are unsuitable for existing performance state management. Ideally these low power SOCs and GPUs run at Pe. The following table shows workload behavior:

| Mode | Workload types |
|---|---|
| BURST | Application/Game Load screen |
| | Desktop composition |
| | Web browsing |
| NON BURST (sustained) | Game playback |
| | Media Transcode |

In one embodiment, the workload behavior is tracked and the energy efficient performance (Pe) states are applied to improve the standby residency of GPU and power consumption.

The workload behavior may be monitored by the GPU workload's duration across "n" number of frames. There is also a threshold that may be used to determine if the workload is burst or sustained for the given number of frames and another time constant "t" to monitor the burst behavior.

Workload monitoring can be done by software running on a host or in firmware running on a special purpose digital signal processor or generic microcontroller, in some embodiments.

If the workload is determined to be burst, then the system sets the GPU performance state (P state) to max turbo mode.

If the device continues to be in burst mode (i.e. above a frequency threshold) over time "t" and the performance state is not an energy efficient state, then the system may lower the P state to "Pe" and monitor if the same workload continues to stay as burst. If not, the P state is raised to the next higher P state.

If the workload transitions from burst mode to sustained mode from max turbo P state, then the P state may drop down to the next lower P state and continue to follow the sustained mode demand based P state transitions.

FIG. 1 is a flow chart for a sequence for determining whether a graphics processing unit is burst mode or sustained mode. It may be implemented in software, firmware, and/or hardware. In software and firmware embodiments it may be implemented by computer executed instructions stored in one or more non-transitory computer readable media such as a magnetic, optical or semiconductor storage. It may be implemented in one embodiment by the graphics processing unit.

The sequence for computing the graphics processing unit active time on successive frames 10 begins by determining if the active time is less than or equal to the burst threshold (diamond 12) of "t" milliseconds. Active time means time above the frequency threshold. The burst maximum threshold "m" and minimum threshold "n" may be set to a percentage of frame time.

If the graphics processing unit active time is less than or equal to the burst threshold, then the maximum turbo performance state is set at block 14 and the mode is determined to be the burst mode in block 16.

If the active graphics processing time is greater than the burst threshold t then a check at diamond 18 determines if the device is in the sustained mode. If so, the mode is determined to be sustained in block 20. The burst threshold, in one embodiment, is set to t milliseconds, the maximum threshold is set to "m" percent and the minimum threshold is set to "n" percent. For example, if the frame time was 50 milliseconds and the time "t" above the frequency threshold was 25 milliseconds, then the percentage is 50%, as a hypothetical illustration.

Figure 2:
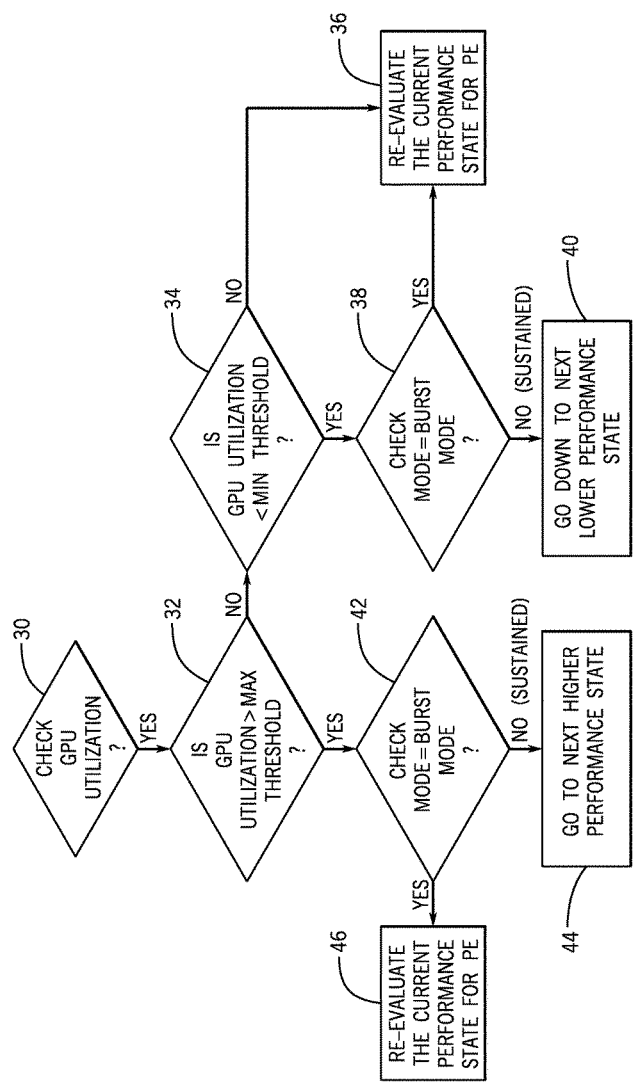
FIG. 2 is a flow chart for another embodiment.

A sequence for checking the graphics processing unit utilization, shown in FIG. 2, may be implemented in software, firmware and/or hardware. In software and firmware embodiments it may be implemented by computer executed instructions stored in one or more non-transitory computer readable media such as magnetic, optical or semiconductor storage. For example, the sequence may be implemented by the graphics processing unit in some embodiments.

The sequence begins when there is a request (diamond 30) to check the graphics processing unit utilization. If so, a check at diamond 32 determines whether the graphics processing utilization is greater than the maximum threshold set to "m" percent. If not, a check at diamond 34 determines if the utilization is less than the minimum threshold of "n" percent. If not, the current performance state for Pe is reevaluated in block 36.

If the graphics processing unit utilization is less than the minimum threshold, as determined in diamond 34, a check at diamond 38 determines whether the mode is burst mode. If so, the current performance state is reevaluated for Pe in block 36. If not, because the device is in the sustained mode, the graphics processing unit is lowered to the next lower performance state in block 40.

If the check at diamond 32 indicates that the graphics processing utilization is greater than the maximum threshold, then the mode is checked for burst mode in diamond 42. If the mode is not burst mode but instead is sustained mode, the graphics processing unit is raised to the next higher performance state in block 44. If the check at diamond 42 determines that the processor is in the burst mode, then the current performance state for Pe is reevaluated in block 46. Otherwise, the sustained mode transitions to the next higher performance state in block 44.

The exact values that are used for t, m, and n are highly device specific. The burst mode and efficient performance level may be defined as an input parameter to an algorithm based on a design point and power/thermal and leakage characteristics. It varies from one design to another. For example, a burst mode for a product may be set at 600 Mhz for 3 to 5 seconds. This may be determined based on the thermals that the design can tolerate while running heavy loads for a given time duration. Therefore this value may be used as the burst duration for a given frequency. The efficient performance point may be determined based on voltage and frequency characteristics of the design. For example, the efficient performance point may be 400 Mhz at 0.65 v for a given design.

Thus in some embodiments, a graphics processing unit does not have to operate in high frequency or power envelopes all the time in order to pass operating system qualification tests in some embodiments.

Figure 3:
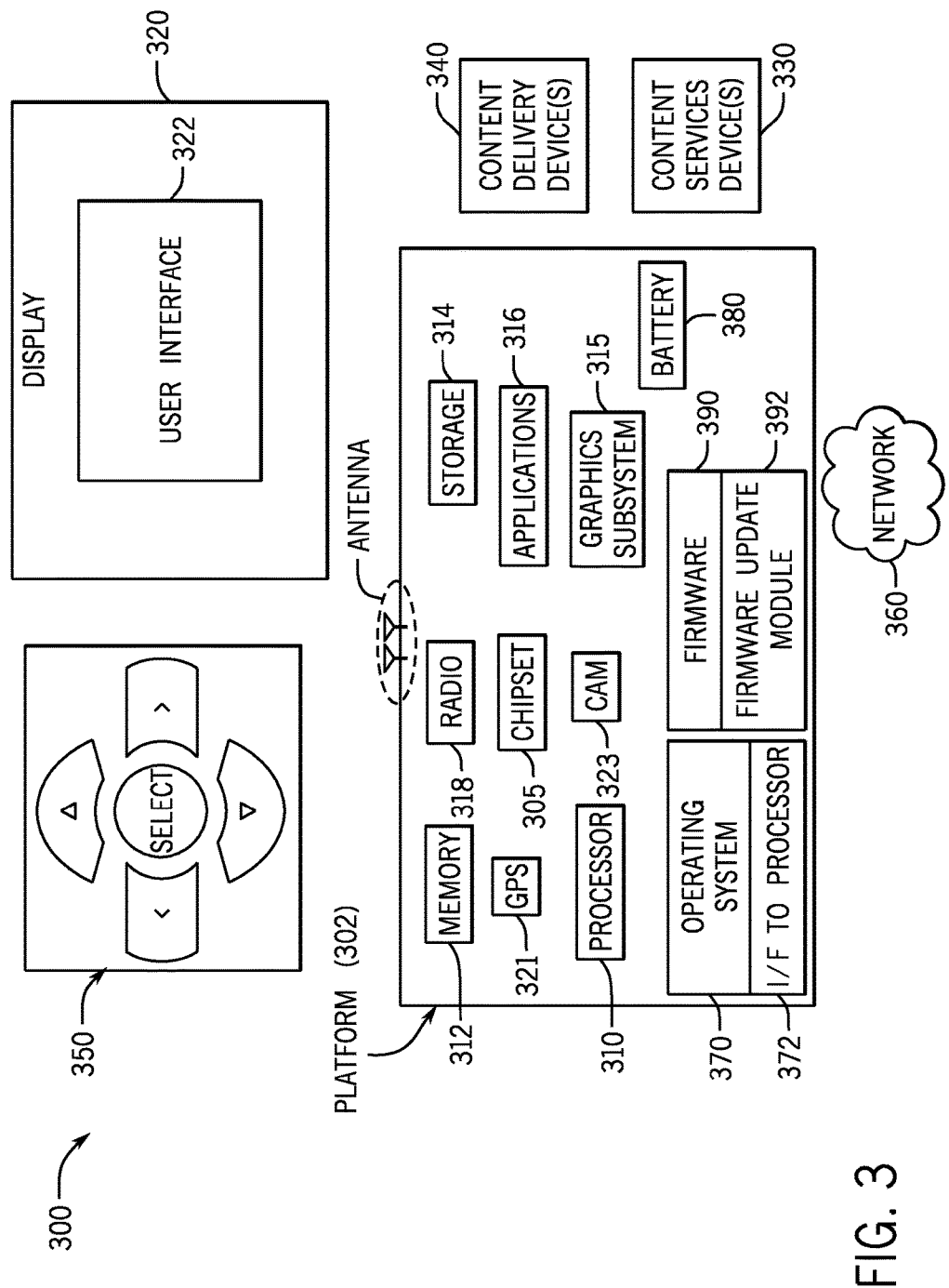
FIG. 3 is a system depiction for one embodiment.

FIG. 3 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth. In one embodiment, the processor may implement the sequences of FIGS. 1 and 2, together with memory 312.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the disclosure.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the disclosure.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
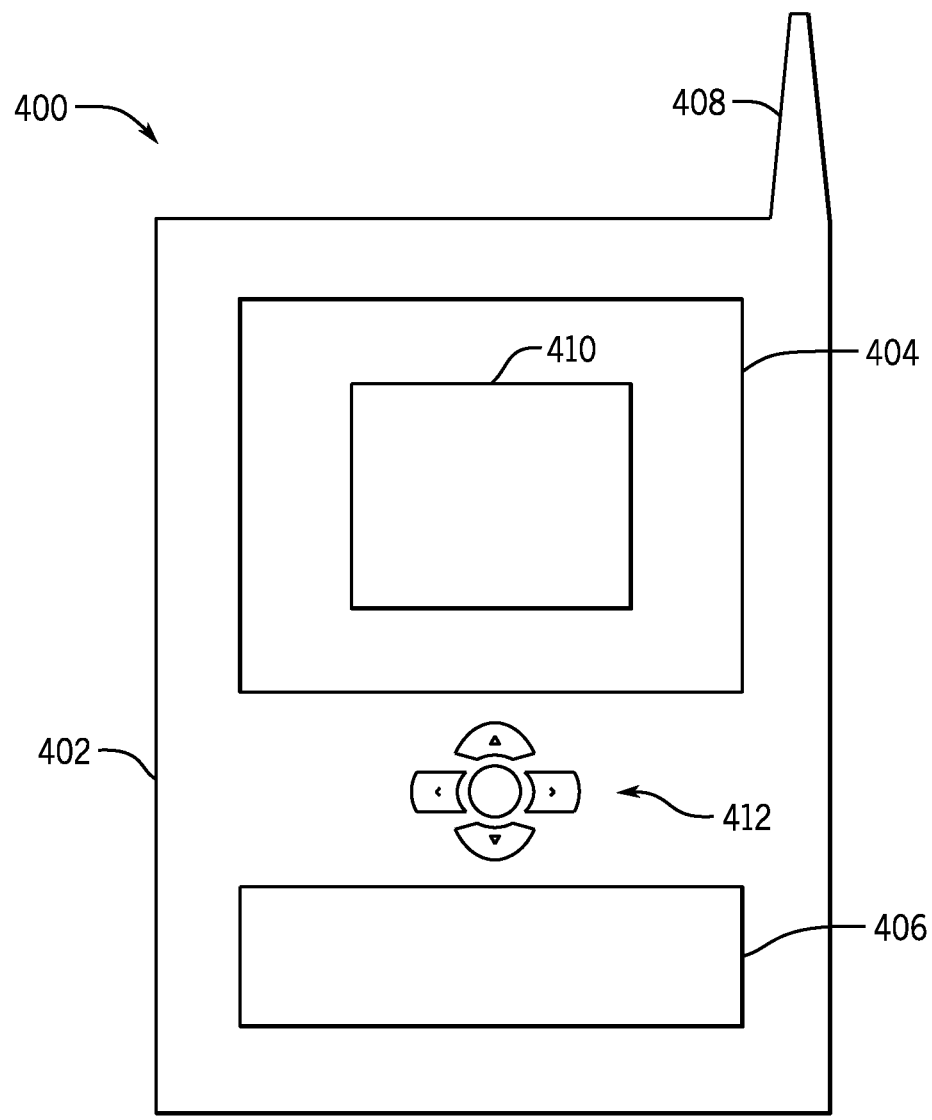
FIG. 4 is a front elevational view of one embodiment.

As described above, system 300 may be embodied in varying physical styles or form factors. FIG. 4 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIG. 3 in software and/or firmware embodiments.

As shown in FIG. 4, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

A method comprising monitoring a graphics processing unit's workload across a number of frames, based on said monitoring, determining whether the unit's workload is above a frequency threshold, and if the workload continues to be above the threshold for a predetermined time period and if a predetermined voltage and frequency is below a maximum threshold, reevaluating the unit's performance state if the unit is in a maximum performance state. The method may also include if the workload continues to be above the threshold for a predetermined time period and if the predetermined voltage and frequency is above the maximum threshold, raising the unit's performance state. The method may also include wherein if the maximum threshold is not exceeded, determining if voltage and frequency is below a minimum threshold, and if so, determining whether the unit is in the maximum performance state. The method may also include wherein if so, reevaluating the performance state. The method may also include wherein if not, lowering the performance state. The method may also include whether if the unit is not in the maximum performance state, raising the performance state.

Another example embodiment may be at least one or more non-transitory computer readable media storing instructions executed by one or more processors to perform a sequence comprising monitoring a graphics processing unit's workload across a number of frames, based on said monitoring, determining whether the unit's workload is above a frequency threshold, and if the workload continues to be above the threshold for a predetermined time period and if a predetermined voltage and frequency is below a maximum threshold, reevaluating the unit's performance state if the unit is in a maximum performance state. The media may include said sequence including if the workload continues to be above the threshold for a predetermined time period and if the predetermined voltage and frequency is above the maximum threshold, raising the unit's performance state. The media may include wherein if the maximum threshold is not exceeded, said sequence including determining if voltage and frequency is below a minimum threshold, and if so, determining whether the unit is in the maximum performance state. The media may include wherein if so, said sequence including reevaluating the performance state. The media may include wherein if not, said sequence including lowering the performance state. The media may include whether if the unit is not in the maximum performance state, said sequence including raising the performance state.

In another example embodiment may be an apparatus comprising a processor to monitor a graphics processing unit's workload across a number of frames, based on said monitoring, determine whether the unit's workload is above a frequency threshold, and if the workload continues to be above the threshold for a predetermined time period and if a predetermined voltage and frequency is below a maximum threshold, reevaluate the unit's performance state if the unit is in a maximum performance state, and a memory coupled to said processor. The apparatus may include if the workload continues to be above the threshold for a predetermined time period and if the predetermined voltage and frequency is above the maximum threshold, said processor to raise the unit's performance state. The apparatus may include wherein if the maximum threshold is not exceeded, said processor to determine if voltage and frequency is below a minimum threshold, and if so, determining whether the unit is in the maximum performance state. The apparatus may include wherein if so, said processor to reevaluate the performance state. The apparatus may include wherein if not, said processor to lower the performance state. The apparatus may include whether if the unit is not in the maximum performance state, said processor to raise the performance state. The apparatus may include firmware and a module to update said firmware, an operating system and a battery.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   monitoring a graphics processing unit utilization;
   determining if graphics processing utilization is greater than a maximum threshold;
   if graphics processing unit utilization is greater than the maximum threshold, determining if the graphics processing unit is in burst mode and if not, going to the next higher performance state, and if so, evaluating for a transition to a performance state with a maximum frequency at a minimum voltage; and
   if utilization is not greater than the maximum threshold, determining if the graphics processing unit utilization is less than a minimum threshold, and if so, determining if the graphics processing unit is in burst mode, and if so, evaluating for transition to a performance state with a maximum frequency and minimum voltage, and if not, going to a lower performance state.

2. One or more non-transitory computer readable media storing instructions executed by one or more processors to perform a sequence comprising:
   monitoring a graphics processing unit utilization;
   determining if graphics processing utilization is greater than a maximum threshold;
   if graphics processing unit utilization is greater than the maximum threshold, determining if the graphics processing unit is in burst mode and if not, going to the next higher performance state, and if so, evaluating for a transition to a performance state with a maximum frequency at a minimum voltage; and
   if utilization is not greater than the maximum threshold, determining if the graphics processing unit utilization is less than a minimum threshold, and if so, determining if the graphics processing unit is in burst mode, and if so, evaluating for transition to a performance state with a maximum frequency and minimum voltage, and if not, going to a lower performance state.

3. An apparatus comprising:
   a processor to monitor a graphics processing unit determine if graphics processing utilization is greater than a maximum threshold, if graphics processing unit utilization is greater than the maximum threshold, determine if the graphics processing unit is in burst mode and if not, going to the next higher performance state, and if so, evaluate for a transition to a performance state with a maximum frequency at a minimum voltage, if utilization is not greater than the maximum threshold, determine if the graphics processing unit utilization is less than a minimum threshold, and if so, determine if the graphics processing unit is in burst mode, and if so, evaluate for transition to a performance state with a maximum frequency and minimum voltage, and if not, going to a lower performance state; and
   a memory coupled to said processor.

4. The apparatus of claim 3, including firmware and a module to update said firmware.

5. The apparatus of claim 3, including an operating system.

6. The apparatus of claim 3, including a battery.

* * * * *